United States Patent [19]

Kitazawa

[11] Patent Number: 5,307,467
[45] Date of Patent: Apr. 26, 1994

[54] STACK SYSTEM
[75] Inventor: Masahiro Kitazawa, Machida, Japan
[73] Assignee: Fujitsu Limited, Kawasaki, Japan
[21] Appl. No.: 884,240
[22] Filed: May 11, 1992

Related U.S. Application Data

[63] Continuation of Ser. No. 408,371, Sep. 18, 1989, abandoned.

[30] Foreign Application Priority Data

Sep. 20, 1988 [JP] Japan ................. 63-233504

[51] Int. Cl.⁵ ............................. G06F 13/14
[52] U.S. Cl. .................. 395/325; 364/240.2; 364/240.5; 364/254.5; 364/283.3; 395/250
[58] Field of Search .................. 395/650, 700

[56] References Cited

U.S. PATENT DOCUMENTS

| | | | |
|---|---|---|---|
| 4,161,778 | 7/1979 | Getson et al. | 395/325 |
| 4,407,016 | 9/1983 | Bayliss et al. | 364/200 |
| 4,635,194 | 1/1987 | Burger et al. | 364/200 |
| 4,674,034 | 6/1987 | Iwashita et al. | 364/200 |
| 4,851,993 | 7/1989 | Chen et al. | 364/200 |

FOREIGN PATENT DOCUMENTS

| | | | |
|---|---|---|---|
| 58-96343 | 6/1983 | Japan | 364/200 |
| 59-43651 | 3/1984 | Japan | G06F 3/04 |
| 61-5365 | 1/1986 | Japan | G06F 15/16 |
| 2184270 | 6/1987 | United Kingdom | G06F 15/16 |

OTHER PUBLICATIONS

Pat. Absts. of JP, vol. 8, No. 135, Jun. 22, 1984 (for 59-43651).
Pat. Absts. of JP, vol. 10, No. 152, Jun. 3, 1986 (for 61-5365).
EPO Search Report, The Hague, search completed Jul. 24, 1991.

Primary Examiner—Gareth D. Shaw
Assistant Examiner—John Q. Chavis
Attorney, Agent, or Firm—Staas & Halsey

[57] ABSTRACT

A command is decoded in a unit to provide bus-output-control information concerning the common bus busy state, and the existence of the command or the data. When the common bus is not available to the unit, the decoded bus out-control information, command and data are stored in the bus output stack. Immediately after the common bus becomes available to the unit, the decoded bus-output-control information is outputted to a control bus and the command and data which are stored in the bus output stack are outputted to the common bus. When the common bus is available to the unit, the bus-output-control information is outputted to the control bus, and the command and data are outputted to the common bus without going through the bus output stack.

18 Claims, 13 Drawing Sheets

COMMAND
(a)

DATA
(b)

| TAG 0 | TAG 1 | INFORMATION ON COMMON BUS |
|---|---|---|
| 0 | 0 | NOT YET DEFINED |
| 0 | 1 | DATA |
| 1 | 0 | NOT YET DEFINED |
| 1 | 1 | COMMAND |

(c)

FORMAT OF IFOR

| PROCESS REQUEST COMMAND | | CORRESPONDING PROCESS END COMMAND |
| --- | --- | --- |
| MS 8 byte fetch | → | MS 8 byte fetch end |
| MS 16 byte fetch | → | MS 16 byte fetch end |
| MS 32 byte fetch | → | MS 32 byte fetch end |
| MS 8 byte store | → | MS 8 byte store end |
| MS 16 byte store | → | MS 16 byte store end |
| MS 32 byte store | → | MS 32 byte store end |
| KS fetch | → | KS fetch end |
| KS store | → | KS store end |
| CONTROL fetch | → | CONTROL fetch end |
| CONTROL store | → | CONTROL store end |

Fig. 10

① 32BFE

| DECODER OUTPUT | 32BFE | | | | | |
|---|---|---|---|---|---|---|
| DCNTR(0:2) | 000 OR 001 | 101 | 100 | 011 | 010 | 001 |
| FF { CBSY | | 11 | 01 | 01 | 01 | 01 |
| TAG(0:1) | 00 OR 01 | | | | | |

② 16BFE

| DECODER OUTPUT | 16BFE | | | |
|---|---|---|---|---|
| DCNTR(0:2) | 000 OR 001 | 011 | 010 | 001 |
| FF { CBSY | | 11 | 01 | 01 |
| TAG(0:1) | 00 OR 01 | | | |

③ 8BFE

| DECODER OUTPUT | 8BFE | | |
|---|---|---|---|
| DCNTR(0:2) | 000 OR 001 | 010 | 001 |
| FF { CBSY | | 11 | 01 |
| TAG(0:1) | 00 OR 01 | | |

④ OTHER

| DECODER OUTPUT | 8BSE | |
|---|---|---|
| DCNTR(0:2) | 000 OR 001 | 001 |
| FF { CBSY | | 01 |
| TAG(0:1) | 00 OR 01 | |

*Fig. 11(b)*

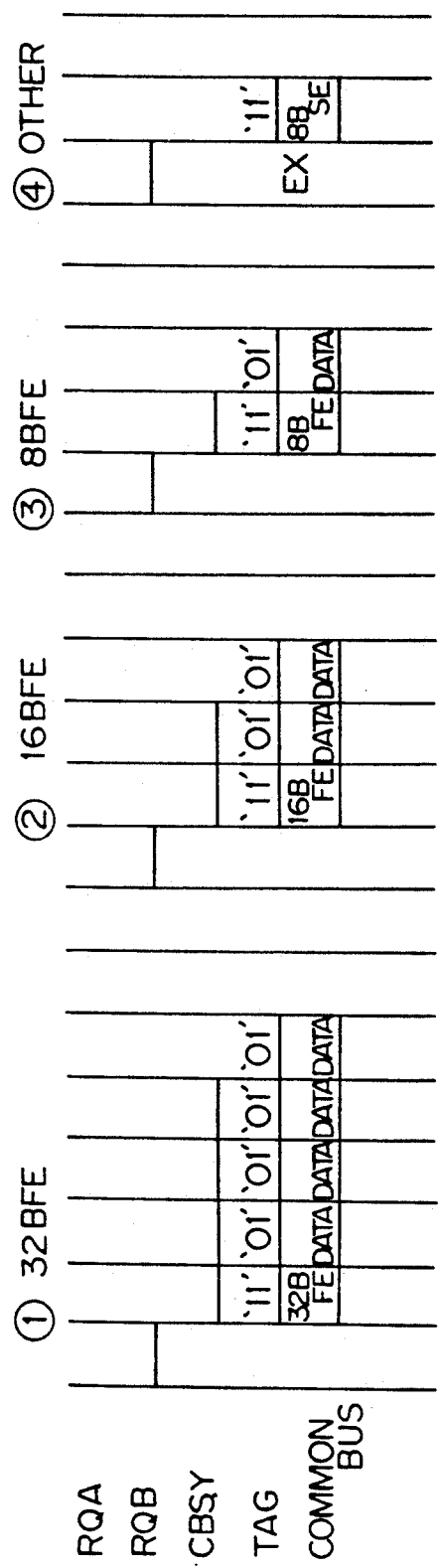

STACK SYSTEM

This application is a continuation of application Ser. No. 07/408,371, filed Sep. 18, 1989, now abandoned.

BACKGROUND OF THE INVENTION

The present invention relates to a system for transmitting and receiving information between units through a common bus and more particularly to a stack system for transmitting and receiving information between units connected to the common bus.

A system for communicating information between units (units U1 to U6) having processors conducted through a common bus (CBUS), as shown in FIG. 1, has been developed in order to increase data transmission speed and data processing speed. In such a system, units U1 to U6 comprise a CPU, a channel unit, a memory control unit, and so on. When units U1 to U6 obtain the right to use the common bus, the output of data from the common bus is controlled by the internal condition of the unit.

Even if data is communicated from one unit to another in such a common bus system, sometimes the common bus cannot be used instantly when it is being used by the other unit or when its right of use for transmission of data has been obtained by the other unit.

When the common bus can not be used instantly as described above, the unit has to wait for the other unit to finish using the common bus. When a request is made to use the common bus to transmit the result obtained by the process of the unit, the next process proceeds after the transmission from the unit is completed or after the transmission using the common bus is ended. However, when it proceeds to the next process after transmission of the data obtained by the process of the unit is completed, as stated above, then the whole process becomes slow. There has been developed a prior art system in which the processes up to the formation of the next transmission data are conducted in parallel in a plurality of units, and a plurality of transmission data are stored.

In such a system, in order to temporarily maintain the transmission data until the right of use of the common bus can be obtained, a stack is formed by a register or random access memory.

FIG. 2 shows a block diagram of the prior art system. Data register (DTR) 10 is a register for storing data to be transmitted, which are created by processes which will be explained later. Where the common bus 6 is being used by the other unit, the present unit has to wait until the use of the common bus is ended. Therefore, data is stored in data stack (DSTK) 11 during the period of use of common bus 6. Similarly, where the command is added to command register (CMDR) 12 through common bus input circuit 4 and command executing control circuit 5 and then the common bus is being used in by the other unit as is similar to the above case, the content of command register 12 is stored in the command stack (CSTK) 13. It may be noted that the command exists by itself or is paired with data.

If common bus 6 is not being used, the content of data register 10 and the command of command register 12 is added to bus out register (BOR) 23. The selector circuit (SEL) 9 selects a part of the command of command register 12 and bus out control (BUS-OUT-CONTROL) 14 controls the bus output by using the part of the command. For example, the selector circuit 9 selects a plurality of upper bits of the command and the selected bits forming a portion of the command are decoded by decoder (DECODER) 15. Bus sequence control (BUS SEQUENCE CONTROL) 16 produces a control signal based on the decoded result. Based on the control signal, register 17 comprising a CBSY flip-flop and TAG flip-flops produce sequence signals which are temporarily stored in the interface out register (IFOR) 19, thereby controlling control bus 7 through bus buffers 21 and 22. During the period of control by control bus 7, portions of output from data register 10 and command register 12 are added to bus out register (BOR) 23 and the content of bus out register 23 is outputted on a common bus 6 through buffer 24.

On the other hand, where the common bus 6 is used by another unit, the data is stored in data stack 11 and the command is stored in command stack 13. Command read register (CRAR) 26 and command write register (CWAR) 25 are connected to command stack 13, which changes their addresses by one, every time an access of read or write is conducted. The read or write addresses of command stack register 13 are determined according to the value designated by command write register 25 and command read register 26. For example, where the common bus 6 is used by the other unit as described above, the command input to command register 12 is stored in command stack 13 in the address designated by command write register 25. Command stack 13 naturally stores a plurality of commands. When a process of the other unit is completed, the command stored in command stack 13 is read out by the address value of command read register 26 corresponding to command write register 25. Selector 9 selects a portion of the output of command stack 13. A portion of the command stored in command stack 13 is decoded in a similar manner to the state where the common bus 6 is not used and bus sequence control 16 controls the sequence. The output is applied to control bus 7 by interface output register 19 through register 17. Therefore, control bus 7 is controlled. The content of data stack 11 and the command is outputted to common bus 6 through bus out register 23 and buffer 24. Outputs of command write register 25 and command read register 26 are added to comparator (COMP) 8 in addition to the address terminal of command stack 13. Comparator 8 always compares the read and write addresses and if they are not coincident the command is stored in command stack 13. In order to transmit the command stored in command stack 13 until the read address accords with the write address, the selector circuit selects the output of command stack 13. The output of command stack 13 is thereby transmitted to bus output control 14. When they are coincident, the selector 9 is selected so that the output from command register 12 is transmitted directly to common bus 6 through bus out register 23.

Circuits similar to command write register 25 and command read register 26 are also connected to the address of data stack 11, although they are not shown in FIG. 2. They increment in accordance with the read or write operation, thereby enabling the data to be temporarily stored in, and the data to be read out from, data stack 11. A single command does not always correspond to a single item of data. When one command is stored in command stack 13, a plurality of data corresponding to the command is stored in data stack 11. The reading operation is conducted in a similar manner to the storing operation. Every time one command is read out, a plurality of data corresponding to the command is read out and outputted to common bus 6 through bus out register 23 and buffer 24.

When common bus 6 is being used by the other unit in the above system, the data and command produced in the unit are stored in command stack 13 and data stack 11, and when use of the common bus 6 by the other unit is completed, namely, when the common bus 6 becomes empty, a portion of the command is analyzed by bus out control 14 after it is outputted from command stack 13 and then transmitted to the common bus 6. When a plurality of commands are stored in command stack 13 in the above system, respective commands are analyzed by bus out control 14, namely, common bus control output circuit, and such analysis should be applied to each respective command. Although it is not shown in FIG. 2, a priority circuit is provided to limit the use of common bus 6 and control bus 7. Thus, even if the right of use of the common bus is obtained through the priority circuit, analysis of the command as recited above is necessary in the bus out control circuit 14 after the command is outputted from command stack 13. Therefore, the command or data cannot be transmitted immediately to the common bus 6. Even if the common bus 6 becomes vacant, the command and data cannot be outputted to it immediately, but they can be outputted to it only after a predetermined sequence passes in bus out control 14. Therefore, even if use of the common bus 6 is completed, a portion of the command in command stack 13 should be analyzed to output the command and data from the unit which is next to be used, thereby resulting in a waste of time.

As command stack 13 is provided separately from data stack 11, it is necessary that an address of the command stack 13 is previously made to correspond to the addresses for the maximum length of data in the data stack 11 as shown in FIG. 3. Therefore, the capacity of the data stack becomes extremely big, as shown in FIG. 3. For example, supposing the number of data accompanied by one command is a maximum of 4, and the number of loads in command stack 13 is n, the number of words in data stack 11 is 4n, making the data stack extremely large.

According to the system in which data is stored sequentially in data stack 11 and the address of the command in command stack 13 is not previously made to correspond to the addresses of the data in data stack 11, the difference between the write and read addresses of the data is always monitored with regard to both data stack 11 and command stack 13. Namely, it is necessary to consider, by monitoring both data stack 11 and command stack 13, how many data are required after the command is executed, thereby complicating a command start control. Where the command is executed continuously, as in a pipeline method, it is necessary, by monitoring both data stack 11 and command stack 13, to judge the start of the next command based on the difference between the sum of the data accompanied by the command which is being executed and the number of the vacancy in the data stack, thereby further complicating the system. If the above control is not employed, the capability of the apparatus is low.

SUMMARY OF THE INVENTION

An object of the present invention is to provide a stack system in which the common bus can be used immediately after the other unit has finished using it, thus preventing wasted vacant time of the common bus.

Another object of the present invention is to decrease a wasted area of a data stack.

Further object of the present invention is to simplify a control of a write and read operation of a stack.

A feature of the present invention resides in a stack system for use in a unit in a system for transmitting and receiving data between units through a common bus, said stack system comprising a bus output control circuit for receiving a command and for decoding the control data to be outputted to common bus, a bus output stack for storing the output of said output control circuit and the command and the data, and a bus output register for selectively outputting either first data comprising the output of said bus output circuit and/or data stored in the bus output stack and said output control circuit, to be outputted to said common bus.

Another feature of the present invention is to provide a single stack in which data and command are commonly stored when a common bus is not vacant.

BRIEF DESCRIPTION OF THE DRAWINGS

FIG. 10 shows the kind of the commands.

FIGS. 11(b) and (c) show timing charts of a sequence control circuit and of outputs to a common bus.

DESCRIPTION OF THE PREFERRED EMBODIMENT

Figure 1:
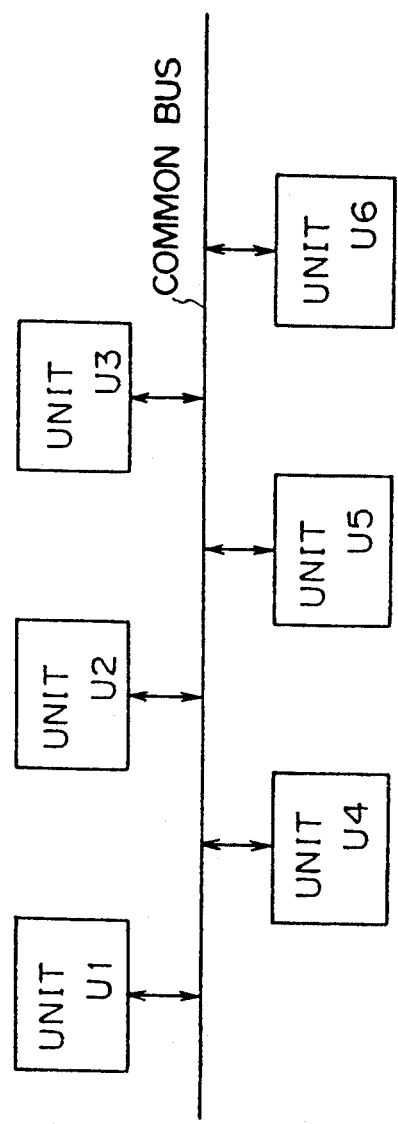
FIG. 1 shows a computer system for connecting a plurality of units by using a common bus.
Figure 2:
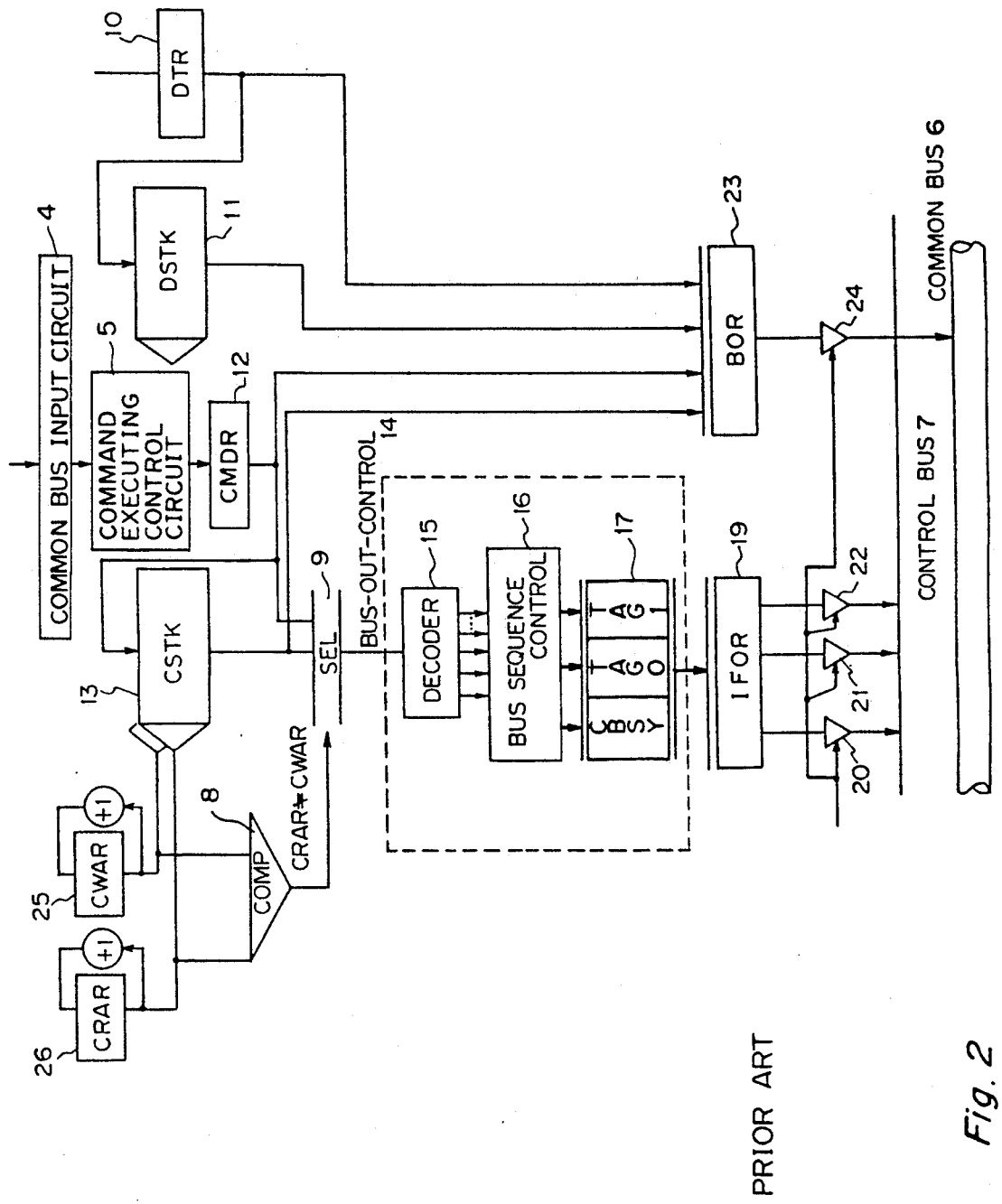
FIG. 2 is a block diagram of a prior art stack system.
Figure 3:
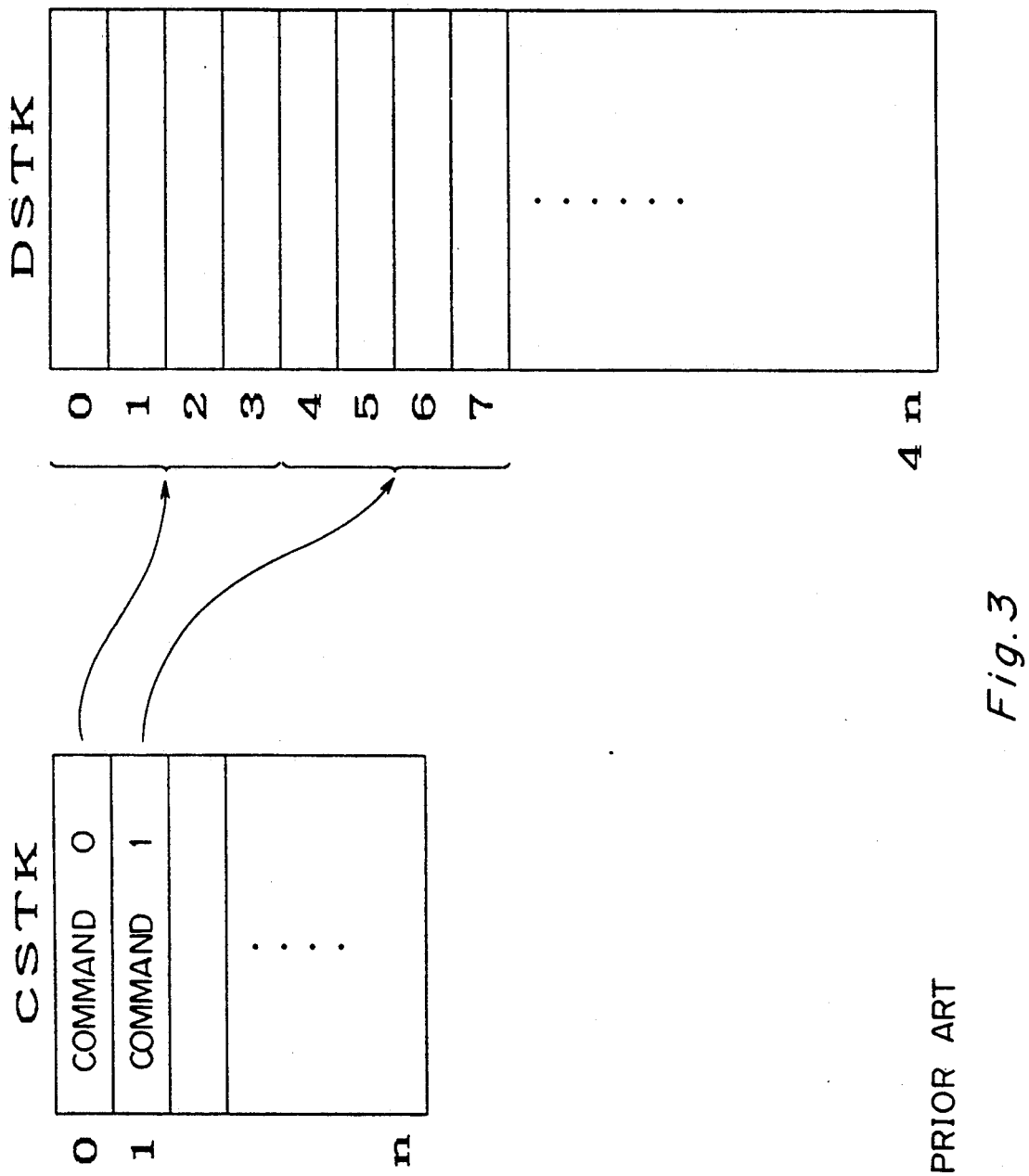
FIG. 3 shows a relation between a command stack and data stack.

The present invention will be explained in detail hereinafter by referring to the drawings.

Figure 4:
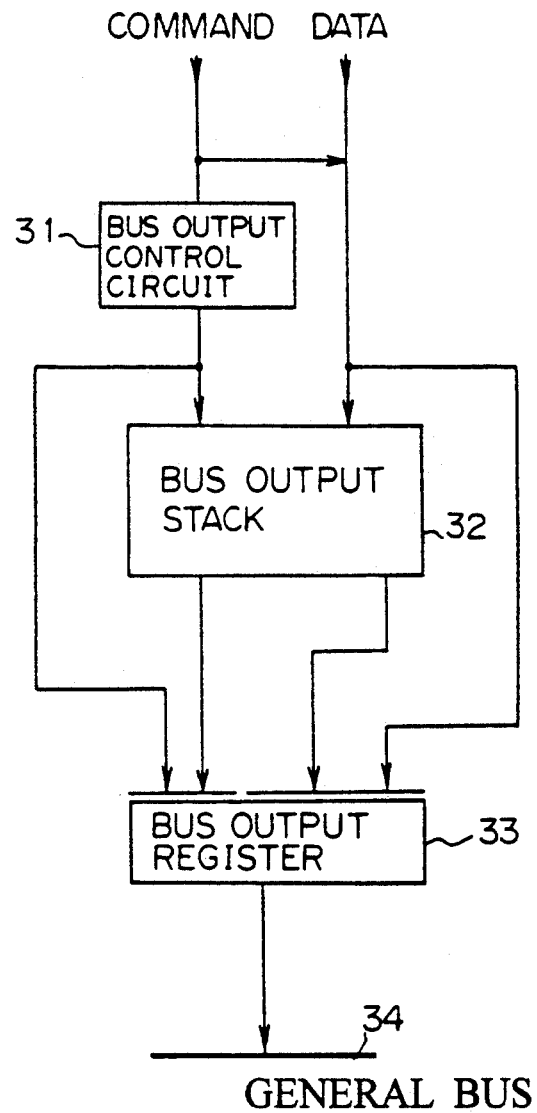
FIG. 4 is a block diagram showing a principle of the present invention.

FIG. 4 shows a block diagram which describes the principle of the present invention. A command is applied to bus output control circuit 31 to provide a decoded bus output control signal and is transmitted to bus output stack 32 and bus output register 33.

The decoded bus output control signal, the command, and the data, are added to bus output stack 32 and stored therein. Bus output register 33 selects a first set of the decoded bus output control signal, the command and the data, or a second set of the decoded bus output control signal, the command and the data which are stored in bus output stack 32, and outputs them to general bus 34 comprising a common bus and a control bus.

When the common bus is not used by the other unit, the output of the bus output control circuit 31, the command, and the data are outputted to common bus 34 through output register 33.

When the common bus 34 is used by the other unit, the decoded output of bus output control circuit 31, and the decoded command and data are stored in bus output stack 32. When use of the common bus is completed, the decoded output from circuit 31, the command and data which are stored in bus output stack 32 are outputted to the common bus 34 through bus output register 33.

The decoded output of bus output control circuit 31 is stored in bus output stack 32 in accordance with a predetermined sequence and is used for controlling the common bus. Therefore, when the bus is released, the command and data of bus output stack 32 can be immediately outputted through bus output register 33 without going through a decoding process of the command. Thus, the time required for the data to be outputted to the common bus is very short and the efficiency of the common bus is increased. Furthermore, the transmission speed is increased.

Figure 5A:
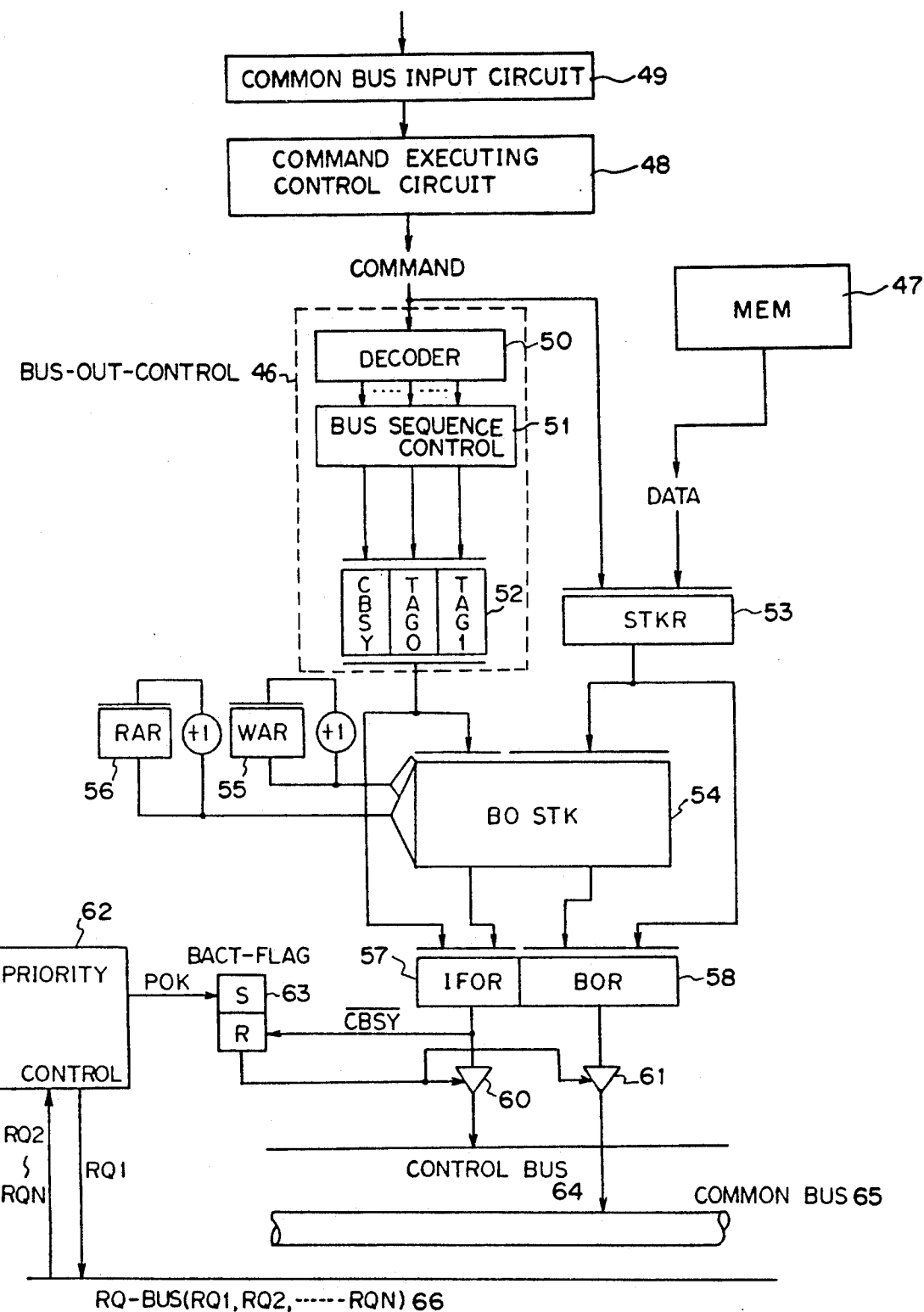
FIG. 5(a) is a block diagram of an embodiment of the present invention.

FIG. 5(a) shows a system structure of an embodiment of this invention.

When a request for data transmission from one unit to another is produced by an apparatus such as a computer system connected to this unit, the request command is applied to common bus input circuit 49 from the above apparatus. Common bus input circuit 49 comprises a buffer circuit including a register and so on. The request command which is applied to common bus input circuit 49 from common bus 65 is inputted to the command executing control circuit 48. Bus output control circuit (BUS-OUT-CONTROL) 46 comprises decoder 50, bus sequence control 51 and register 52. Decoder 50 to which a portion of the command is added decodes the command portion and analyzes the input command portion. Decoder 50 adds the decoded result to bus sequence control (BUS SEQUENCE CONTROL) 51, which produces a sequence signal necessary for respective circuits based on the decoded result and stores CBSY, TAG0 and TAG1 signals in CBSY flip-flop and first and second TAG flip-flops in register 52, respectively. The data corresponding to the command is stored in memory (MEM) 47 by the computer system. The command and the data from memory 47 are stored in stack register (STKR) 53.

When the common bus is being used in this state, i.e., the transmission is conducted between the other units, the content of register 52 and stack register 53 are stored in bus out stack (BOSTK) 54. Bus out stack 54 has a word length of 67 bits including 3 bits corresponding to outputs of CBSY flip-flop and TAG flip-flops of register 52. The write address register or counter (WAR) 55 and read address register or counter (RAR) 56 are connected to the addresses of the bus out stack 54, in which command and data are written in the address designated by write address register 56.

When the use of the bus is completed, bus out stack 54 is addressed by the value of read address register 56 and produces the stored command and data to interface out register (IFOR) 57 and bus out register (BOR) 58. The output of interface out register 57 and bus out register 58 are applied to control bus (CONTROL BUS) 64 and common bus (COMMON BUS) 65 through buffers 60 and 61, respectively. Control bus 64 and common bus 65 correspond to general bus 34 in FIG. 4.

In the embodiment of the present invention, request RQ1 is transmitted to the request bus (RQ-BUS) 66 to use the common bus 65 for the transmission. When requests RQ2 to RQn do not exist, priority control 62 produces the signal POK and sets set-reset flip-flop (BACT-FLAG, i.e. bus active flag) 63. This activates buffers 60 and 61 to produce the decoded output of bus output control circuit 46 and the command and data to control bus 64 and common bus 65, respectively.

The reverse signal of CBSY previously stored in bus out stack 54 before transmission resets set-reset flip-flop 63, thereby completing the transmission of a set of command and corresponding data. That is, upon a reset, the output of set-reset flip-flop 63 is added to buffers 60 and 61, thereby stopping the outputs to control bus 64 and common bus 65.

On the other hand, when the common bus 65 is not used by the other unit and is kept empty, the decoded bus output control signal stored in register 52 and the command and data stored in stack register 53 are directly added to interface out register 57 and bus out register 58, respectively. After only a certain delay is applied to the command and data by interface out shift register 57 and bus out register 58, the bus output control signal and the command and data are outputted to control bus 64 and common bus 65, respectively.

Based on the state of use of the bus, situations are divided into cases where the decoded output from bus output control circuit 46, command and data are directly transmitted to control bus 64 and common bus 65 and those where they are temporarily stored in the bus output stack 54 and is thus transmitted upon the common bus release. Both cases operate selectively.

According to the present invention, when the bus is occupied by the other unit, decoder 50 decodes a part of the command, and then bus sequence control 51 forms a sequence of the commands which are stored sequentially in the bus out stack 54. Therefore, it is not necessary to perform these processes of decoding the command and of forming the sequence of the commands when the common bus 65 becomes available, i.e., after the right to use the common bus is obtained by the particular unit. Thus, the data and the command can be directly outputted to the bus from bus out stack 54 immediately after the common bus becomes empty. With regard to a signal RQN within request bus 66, the signal for requesting the right to use the common bus is applied from the respective units. The unit that has the highest priority request of the turned-on request signals obtains the right to use the common bus for the next cycle. When a unit with the next-higher priority than a particular unit, has finished using the common bus, the particular unit obtains the right to use it. The particular unit then conducts its data transmission through the common bus.

In the above operation, interface out register 57 outputs the common bus busy signal (CBSY) to the control bus. After the particular unit obtains the right to use the common bus, it transmits command or data and if it continues to use the common bus, the CBSY signal is turned on. If the signal CBSY is turned on, the unit which turned it on can use the common bus for the next cycle. Priority control 62 sets the bus active flag flip-flop 63 even after it is reset by the CBSY and then transmits the following command or data.

In the embodiment shown in FIG. 5(a), a part of the command is decoded to provide CBSY signal and TAG0 and TAG1 signals, which are stored in bus out stack 54 as decoded signals. Therefore, it is not necessary to decode the part of the command after the command is outputted from bus out stack 54, thereby enabling the decoded output from bus output control circuit 46 and command and data to be applied to control bus 64 and common bus 65, immediately after the common bus becomes available.

Figure 6:
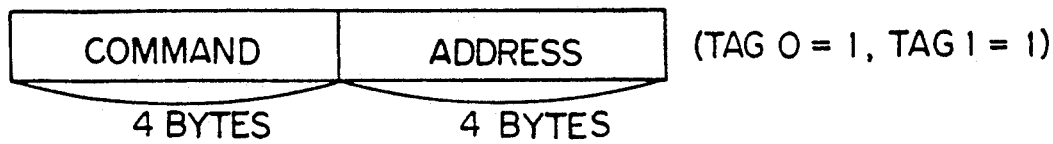
FIGS. 6(a) to (c) shows structures of command, data and tag.
Figure 6:
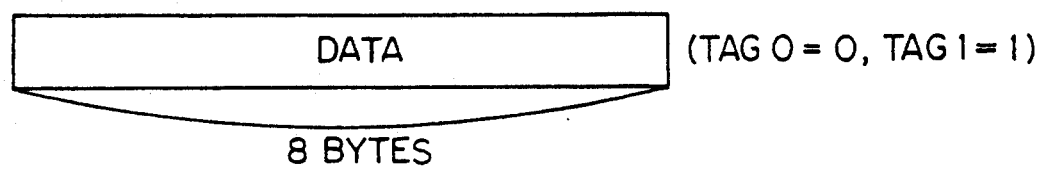
Figure 5B:
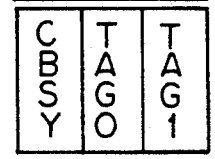
FIG. 5(b) shows a format of IFOR in FIG. 5(a)

FIGS. 6(a) and (b) show the structure of the command and data outputted to the common bus.

When TAG0 and TAG1 are commonly 1 and 1, it shows the command. Then, 4 bytes are for the command and the following 4 bytes are for the address, thereby forming one command group. Where the TAG0 is 0 and TAG1 is 1, it shows the data and all 8 bytes are formed of the data as shown in FIG. 6(c). When both TAG0 and TAG1 are 0, or where TAG0 is 1 and TAG1 is 0, it is possible to set the other states in these cases even though these states are not yet defined.

Figure 7:
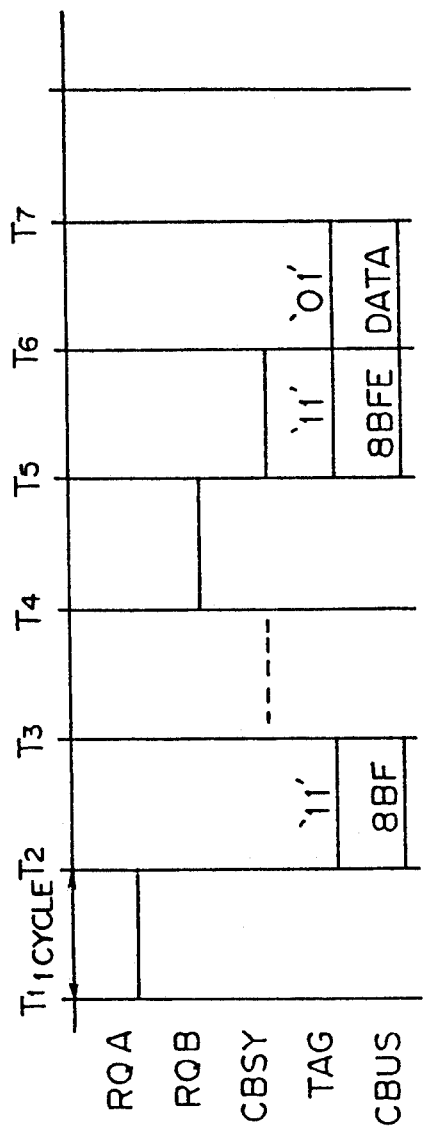
FIG. 7, 8(a) and 8(b) show timing charts of the embodiment of the present invention.

FIG. 7 shows an explanation of the timing of the present invention. The case where an 8-byte fetch (8BF), an 8-byte fetch end (8BFE), an 8-byte store (8BS), and an 8-byte store end (8BSE) are used as the command, is explained. For example, upon an 8-byte fetch (8BF), unit A transmits an 8-byte fetch command to unit B and unit B returns an 8-byte fetch command and 8-byte fetch data to unit A, Then, unit A outputs the request RQA (cycle T1), and, when a unit with the higher priority request does not produce a request, the unit A turns on TAG0 and TAG1 to "1" and "1" upon the next cycle T2, and outputs 8BF, that is, an 8-byte fetch, to the common bus. Unit B receives the output.

When the return operation is conducted, unit B outputs request RQB to request bus 66 (cycle T4). Thereafter, CBSY is outputted and TAG0 and TAG1 are turned to 1 and 1, thereby outputting 8BFE to the command bus CBUS (Cycle T5). Consequently, CBSY is active and when subsequent data exists, TAG0 and TAG1 become 0 and 1, thereby sequentially producing the data (Cycle T6).

In the conventional method, at first, the request is produced, then priority control 62 outputs the POK signal and thereafter the command is analyzed, thereby producing CBSY and TAG to the control bus through interface out register 57 and producing the command or data to the common bus. However, according to the present invention, CBSY, TAG0 and TAG1 are first formed. Therefore, immediately after the priority control circuit produces POK, those command and data can be outputted to the control bus or the common bus.

Figure 8:
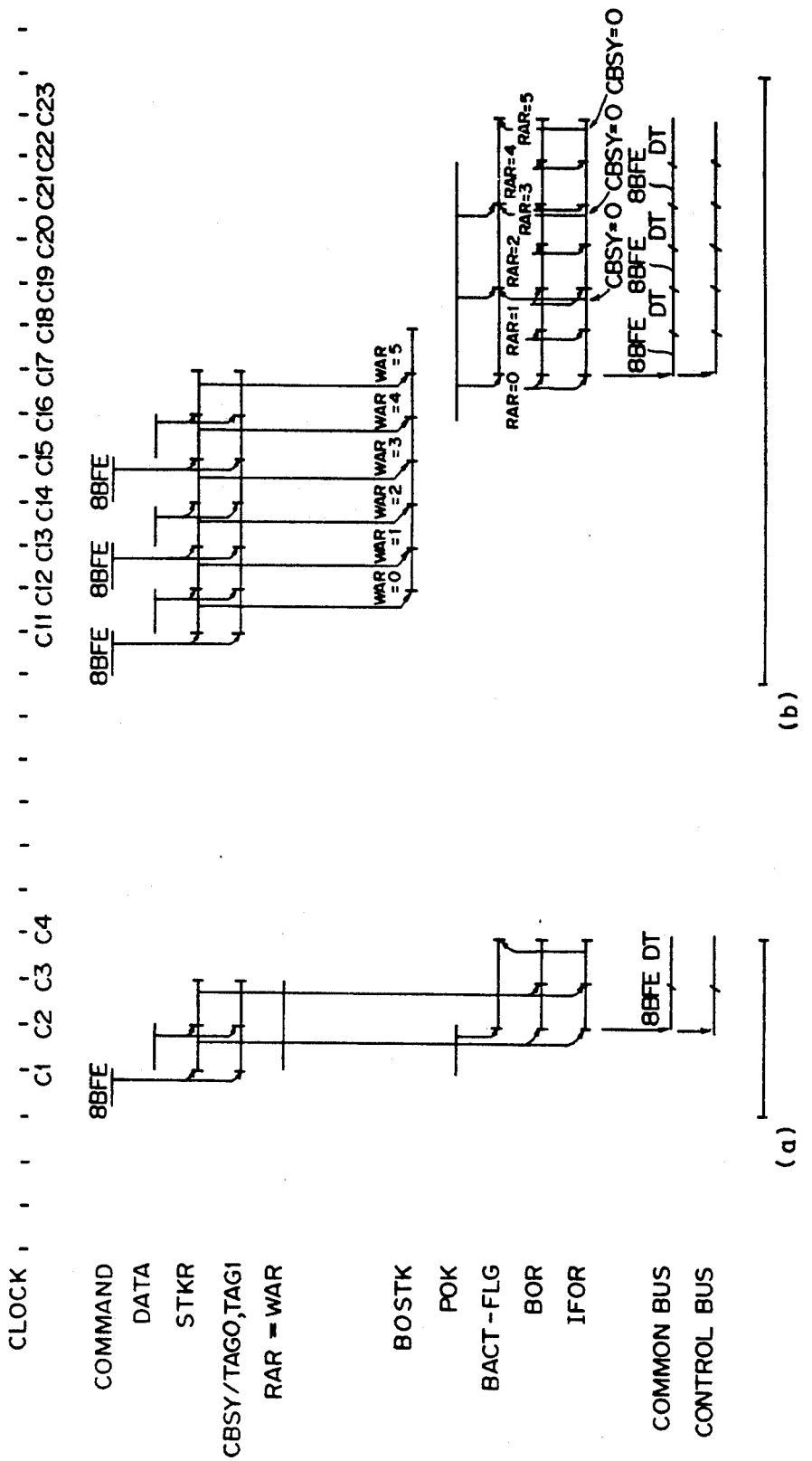

The system shown in FIG. 5(a) is now explained in more detail by referring to a timing chart of FIGS. 8(a) and (b). FIG. 8 (a) shows the case where the command and data are produced to the common bus 65 without being stored in bus out stack 54.

When a command (8BFE) of 8 bytes is applied, it is outputted to stack register 53, and CBSY/TAG0 and TAG1 are outputted to register 52 at a clock C1. Then the signal POK is applied, BACT-FLAG is set at the next clock C2 and the above command, and CBSY/TAG0 and TAG1 are simultaneously stored in the register BOR and IFOR, thereby being outputted to common bus 65 and control bus 64, respectively. At clock C2, BACT-FLAG is set and buffers 60 and 61 are turned on.

At clock C2, the data are stored in the stack register STKR, and CBSY/TAG0 and TAG1 are stored in register 52. The data stored at clock C2, the command, and CBSY/TAG0 and TAG1, are stored in the registers BOR and IFOR at clock C3, and are thereby outputted to common bus 65 and control bus 64. At this timing, BACT-FLAG is kept set.

When the command and data are outputted from BOR 58 and IFOR 57, CBSY is turned to "1" and BACT-FLAG is not reset, and the signal POK is kept set. Upon the following input of clock C4, no command or data to be transmitted exists and CBSY is turned to "0". Thus, flip-flop (BACT-FLAG) 63 to which the inverted CBSY signal is added is reset, thereby turning the buffers 60 and 61 off. Thus, 8BFE becomes active only when a single command and a single item of data is outputted to the common bus.

FIG. 8(b) shows the case where the command and data are temporarily maintained in the BOSTK 54 until the right to use the common bus is obtained. When the right to use the common bus is obtained, they are applied to BOR and IFOR from the BOSTK, thereby being output to the common bus. When the first command 8BFE is applied as a command, the command is stored in the STKR at clock C11, and CBSY/TAG0 and TAG1 are stored in register 52. Therefore, the first data, corresponding to the first command, are similarly stored in STRK at clock C12. At clock 12, the first command and CBSY/TAG0 and TAG1 are stored simultaneously in BOSTK. At clock C13, the second command 8BFE is stored in STKR 53, and CBSY/TAG0 and TAG1 are stored in register 52. At clock C13, the first data is stored simultaneously in BOSTK 54. In FIG. 8(a), no command and data are stored in BOSTK 54 and then RAR=WAR. In FIG. 8(b), every time command or data is stored, WAR increases the address by 1.

As described above, three numbers of 8BFE increase the 6 addresses. When the use of the bus by the other unit is completed and the particular unit produces the signal POK, it obtains the right to use the bus, i.e., the BACT-FLG is set. It then proceeds the reading of BOSTK 54 and increases the reading addresses from RAR0 to RAR5, thereby producing 3 pairs of command and data to the common bus, each comprising the 8BFE and DT. After a pair of command and data is inputted to the common bus, CBSY is temporarily turned to 0. However, when the request for the use of the common bus is not received from the upper priority unit, then the signal POK immediately sets the BACT-FLAG, thereby producing a continuous output.

Figure 9:
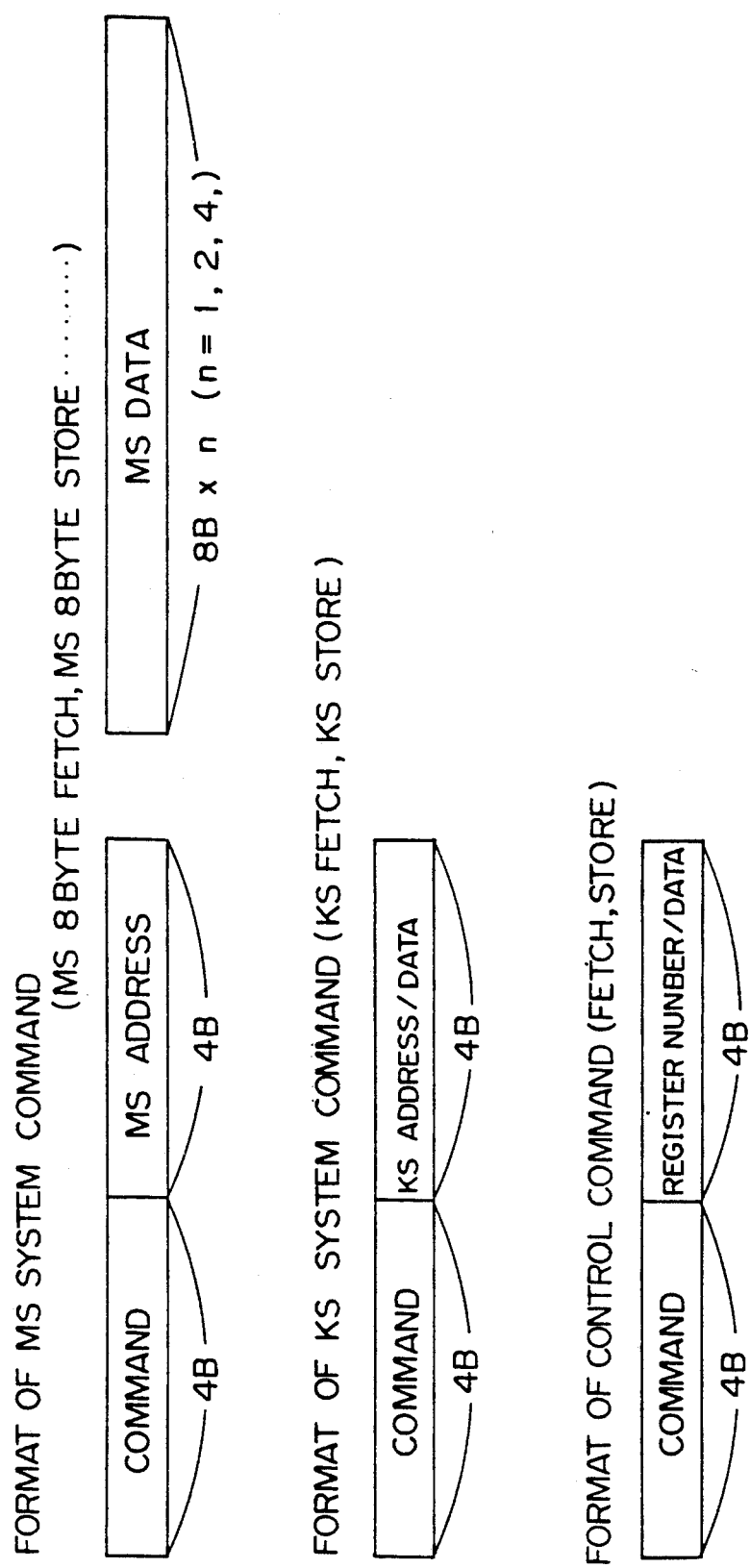
FIG. 9 shows formats of various commands.

As shown in FIG. 9, respective commands such as MS system command and KS system command and Control command comprise one command group comprising a 4-byte command, 4-byte addresses, and data following the command, thereby forming a series of processes. In the MS system command, 8, 16, or 32-byte data exist for the command. In the KS system command and control command, the data may be included in a bit portion for the address.

The command (4 byte) used in this embodiment the present invention is shown in FIG. 10. The process request commands from an MS 8-byte fetch to an MS 32-byte fetch correspond to the process end commands from an MS 8-byte fetch end to an MS 32-byte fetch end, respectively. An MS 8-byte fetch means a process request for reading out the 8-byte data from the main memory to the CPU. An MS 16-byte fetch means a read of 16 bytes and an MS 32-byte fetch means a read of 32 bytes.

The process request commands from an MS 8-byte store to an MS 32-byte store correspond to the process end commands from an MS 8-byte store end to an MS 32-byte store end, respectively.

An MS 8-byte store means that 8-byte data is stored in the main memory as a result of the process request An MS 16-byte store means that 16 bytes of data are stored, an MS 32-byte store means that 32 bytes of data are stored. In this embodiment of the present invention 8 bytes constitute one item of data and when the 8-byte MS 8 byte fetch corresponds to 8-byte data, one item of data is outputted to the common bus, following one command. A KS fetch end is provided for a KS fetch as the process end command, and a KS store end is stored for a KS store as the process end command. These processes are for key inputs.

A control fetch end is provided for a control fetch as the process end command, and a control store end is provided for a control store as process end commands. A control store is a command for transmitting data from the CPU to the other unit such as a memory and is a store processing applied to the programmable register within respective units. A control fetch is for reading data from the programmable register within the units. According to this embodiment, control input and output registers are provided for respective units, and reading from and writing to these registers correspond to control fetch and control store.

Figure 11A:
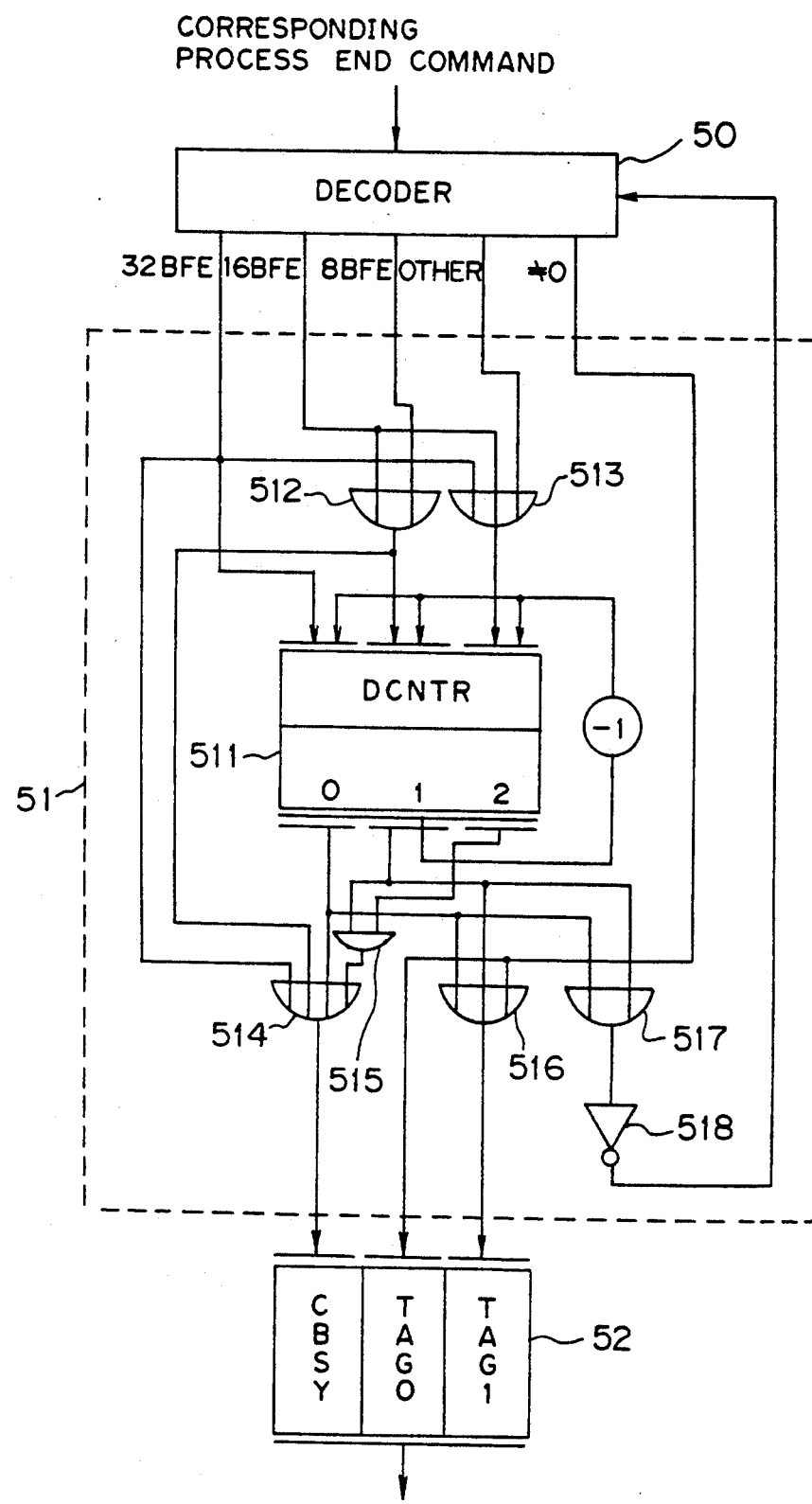
FIG. 11(a) shows a block diagram control circuit in FIG. 5(a)

FIG. 11(a) shows the circuit of the bus sequence control 51 of FIG. 5(a) and FIG. 11(b) is a timing chart of the circuit of FIG. 11(a). The process end command corresponding to the process request command is decoded by decoder 50 to provide 32BFE, 16BFE, 8BFE, the other output, or not-equal-zero($\neq$0) output. 32BFE, 16BFE and 8BFE correspond respectively to the MS32 byte fetch end, the MS16 byte fetch end and the MS8 byte fetch end, which are shown in FIG. 10. Decrement counter (DCNTR) 511 comprises 3 bits and performs a down-count of "−1" per cycle. An input gate circuit of the decrement counter comprises DR gates 512 and 513. An output gate circuit of decrement counter 511 comprises OR gates 514, 516 and 517, AND gate 515, and inverter 518. As shown in (1)32BFE of FIG. 11(b), decoder 50 recognizes 32BFE when decrement counter 511 shows "000" or "001", and decrement counter 511 is set to "101" through OR gate 513 at the next cycle. Thereafter, the status of decrement counter 511 changes in the sequence "100"--"011"--"010"--"001"-"000". When decrement counter 511 shows "101", the CBSY flip-flop is set to "1" and the TAG flip-flop is set to "11"through OR gates 514 and 516. This means that the common bus is busy and the command 32BFE is on the common bus as shown in (1)32BFE of FIG. 11(c). When decrement counter 511 shows "100", the CBSY flip-flop is set to "1" and the TAG flip-flop is set to "01", through OR gates 514, 516 and 517, and inverter 518. The output of inverter 518 shows whether or not the next end command can be processed by decoder 50. When the output of decrement counter 11 is "0"or "1", the inverter 518 produces "1", thereby enabling decoder 50 to receive the input. When the output of decrement counter 511 is "101", "100", "011"or "010"the inverter produces "0", thereby outputting "0"output from decoder 50 and setting the TAG flip-flop to "01". The CBSY flip-flop is set to "1", when decoder 50 recognizes 32BFE, 16BFE or 8BFE and the decrement counter 511 shows "101", "100" or "011", and the CBSY flip-flop is set to "0" in all other cases. When the input of decoder 50 is not "0", it recognizes a command. At the next cycle, the TAG flip-flop is set to "11"and thereafter, it is set to "01" until decrement counter 511 becomes "001". When decrement counter 511 is "001" or "000", the TAG flip-flop is set to "00"but command. FIG. 11(c) shows the state of the common bus when 32BFE, 16BFE, 8BFE or the other command and data are outputted to the common bus, in accordance with a request signal RQB of the particular unit.

As described above, according to the present invention, the delay conventionally caused by decoding the command and setting CBSY and TAG0, TAG1 to the IFOR may be decreased when the data and command are outputted to the common bus from the stack. Therefore, the condition to be satisfied when the command and data are outputted to the common bus can be simplified, thereby achieving an output control circuit with a simple structure and increasing an efficiency of the common bus.

What is claimed is:

1. A stacking system connectable to a general bus, including a common bus and a control bus, to transmit and receive data and a command through said general bus, comprising:
   bus output controlling means for decoding the command to provide a bus output control signal,
   bus output stacking means, operatively connected to an output of said bus output controlling means and to said general bus, for storing said bus output control signal, the command and the data when said general bus is busy, and
   but outputting means, operatively connected to said bus output stacking means and to said general bus, for immediately outputting to said general bus, when said general bus is available for use, output information comprising said bus output control signal, the command and the data either directly or from said bus output stacking means if the output information was previously stored in said bus output stacking means.

2. The stacking system according to claim 1, wherein said bus output stacking means includes means for storing said but output control signal, the command and the data when said common bus is busy and for signalling to said bus outputting means to output the command and the data to said common bus when said common bus is available for use.

3. The stacking system according to claim 2,
   wherein said bus output controlling means includes means for transmitting said bus output control signal to said control bus.

4. The stacking system according to claim 1,
   wherein said bus output controlling means outputs designation information designating which of the command and the data are to be outputted to said common bus, and
   wherein said bus output stacking means includes means for storing said designation information.

5. The stacking system according to claim 1, wherein said bus output controlling means includes means for receiving at least a part of the command and for determining an amount of the data following the command to be applied to said bus output stacking means.

6. The stacking system according to claim 1, further comprising:
   first address counter means, operatively connected to said bus output stacking means, for incrementing a first stack address outputted to said bus output stacking means every time the command and the data are stored in said bus output stacking means, and
   a second address counter means, operatively connected to said bus output stacking means, for incrementing a second stack address outputted to said bus output stacking means every time the command and the data are outputted to said common bus from said bus output stacking means.

7. A stacking system according to claim 1, wherein said bus output controlling means includes means for providing to said bus output stacking means and said bus outputting means the bus output control signal, and wherein the bus output control signal comprises a first signal designating that said common bus is busy and second signals designating whether a signal on said common bus is the command or the data.

8. The stacking system according to claim 7, wherein said bus output controlling means includes means for generating said first signal when predetermined data exists on said common bus.

9. The stacking system according to claim 8, further comprising:
priority circuit means for receiving said first signal and for determining whether said stacking system has priority to use said common bus,
means for transmitting the output information from said bus outputting means to said general bus when said priority circuit means determines that said stacking system has priority to use said common bus, and
means for preventing transmission of the output information from said bus outputting means to said general bus when said priority circuit means determines that said stacking system does not have priority to use said common bus.

10. A stacking system connectable to a general bus, including a common bus and a control bus, for transmitting and receiving data and a command through said common bus, comprising;
transceiver means for transmitting and receiving the command and the data,
bus output controlling means for decoding the command to provide a bus output control signal,
bus output stacking means, coupled to said bus output controlling means and said transceiver means, for storing said bus output control signal, the command and the data when said common bus is busy, and
bus outputting means, coupled to said bus output controlling means, said transceiver means and said bus output stacking means for immediately outputting said bus output control signal, the command and the data to said general bus when said general bus is available for use, either from said bus output controlling means and said transceiver means, or from said bus output stacking means if the bus output control signal, the command and the data were previously stored in said bus output stacking means.

11. The stacking system according to claim 10, wherein said bus output stacking means includes means for storing the bus output control signal, the command and the data when said common bus is busy, and for signalling to said bus outputting means to output the command and the data to said common bus when said common bus is available for use.

12. A stacking system according to claim 10, and wherein said bus output controlling means includes means for transmitting said bus output control signal to said control bus.

13. The stacking system according to claim 10, wherein
said bus output controlling means outputs a designation signal designating whether signals to be outputted to said common bus are the command or the data, and
said bus output stacking means includes means for storing said designation signal.

14. The stacking system according to claim 10, wherein said bus output controlling means includes means for receiving at least a part of the command and for determining an amount of the data following the command to be applied to said bus output stacking means.

15. The stacking system according to claim 10, further comprising:
first address counter means, operatively connected to said bus output stacking means, for incrementing a first stack address outputted to said bus output stacking means every time the command and the data are stored in said bus output stacking means, and
second address counter means, operatively connected to said bus output stacking means for incrementing a second stack address outputted to said bus output stacking means every time the command and the data are outputted to said common bus from said output bus stacking means.

16. The stacking system according to claim 10, wherein said bus output controlling means includes means for providing to said bus output stacking means and said bus outputting means said bus output controlling signal, and wherein said bus output controlling signal comprises a first signal designating that said common bus is busy and second signal designating when a signal on said common bus is the command or the data.

17. The stacking system according to claim 16, wherein
said bus output controlling means includes means for generating said first signal when predetermined data exists on said common bus.

18. The stacking system according to claim 17, further comprising:
priority circuit means for receiving said first signal and for determining whether said stacking system has priority to use said common bus,
means for transmitting output information including said bus output control signal, the command and the data from said bus outputting means to said general bus when said priority circuit means determines that said stacking system has priority to sue said common bus, and
means for preventing transmission of the output information from said bus outputting means to said general bus when said priority circuit means determines that said stacking system does not have priority to use said common bus.

* * * * *

UNITED STATES PATENT AND TRADEMARK OFFICE
CERTIFICATE OF CORRECTION

PATENT NO. : 5,307,467
DATED : April 26, 1994
INVENTOR(S) : Masahiro Kitazawa

It is certified that error appears in the above-indentified patent and that said Letters Patent is hereby corrected as shown below:

\*   Drawing Sheet 9 of 13, Fig. 9, delete "NUNBER" and insert --NUMBER--.

Col. 4, line 38, after "diagram" insert --of a sequence--.

Col. 5, line 6, after "the" (first occurrence) insert --common--.

Col. 8, line 48, after "embodiment" insert --of--.

UNITED STATES PATENT AND TRADEMARK OFFICE
CERTIFICATE OF CORRECTION

PATENT NO. : 5,307,467
DATED : April 26, 1994
INVENTOR(S) : Masahiro Kitazawa

It is certified that error appears in the above-indentified patent and that said Letters Patent is hereby corrected as shown below:

Col. 9, line 37, delete "-" and insert ------;

line 48, delete "11" and insert --511--; and line 62, after "but" insert --it is again set to "11" upon receiving the next--.

Col. 11, line 60 (claim 12), delete "and".

Col. 12, line 54 (claim 18), delete "sue" and insert --use--.

Signed and Sealed this

Twenty-seventh Day of September, 1994

BRUCE LEHMAN

Attest:

Attesting Officer

Commissioner of Patents and Trademarks